(12) United States Patent
Tanaka et al.

(10) Patent No.: US 8,199,190 B2
(45) Date of Patent: Jun. 12, 2012

(54) IMAGE PROCESSING APPARATUS AND IMAGE PROCESSING METHOD

(75) Inventors: Isahiko Tanaka, Susono (JP); Shin-ichi Kojima, Nisshin (JP); Takashi Naito, Tajimi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 442 days.

(21) Appl. No.: 12/451,246

(22) PCT Filed: May 9, 2008

(86) PCT No.: PCT/IB2008/002003
§ 371 (c)(1),
(2), (4) Date: Nov. 3, 2009

(87) PCT Pub. No.: WO2008/139328
PCT Pub. Date: Nov. 20, 2008

(65) Prior Publication Data
US 2010/0073503 A1    Mar. 25, 2010

(30) Foreign Application Priority Data
May 9, 2007    (JP) .................. 2007-124749

(51) Int. Cl.
*H04N 9/47* (2006.01)
*H04N 5/222* (2006.01)
(52) U.S. Cl. ................. 348/77; 348/78; 348/370
(58) Field of Classification Search .............. 348/77, 348/78, 170, 171, 370; 712/36, 215–220, 712/226; 382/304, 318, 117, 118
See application file for complete search history.

(56) References Cited

U.S. PATENT DOCUMENTS

| | | | |
|---|---|---|---|
| 6,477,181 B1 * | 11/2002 | Fujimori et al. | 370/476 |
| 7,646,422 B2 * | 1/2010 | Kisacanin et al. | 348/370 |
| 2003/0217093 A1 | 11/2003 | Dailey | |
| 2004/0255296 A1 | 12/2004 | Schmidt et al. | |
| 2005/0223379 A1 | 10/2005 | Rehg et al. | |

FOREIGN PATENT DOCUMENTS

JP    A 2001-169275    6/2001

(Continued)

OTHER PUBLICATIONS

Salgian et al., "Visual Routines for Autonomous Driving," Sixth International Conference on Computer Vision, Jan. 4-7, 1998, pp. 876-882.

(Continued)

*Primary Examiner* — Lin Ye
*Assistant Examiner* — Euel Cowan
(74) *Attorney, Agent, or Firm* — Oliff & Berridge, PLC

(57) ABSTRACT

An image processing apparatus is configured so that a combination of the processes that are performed is set for each of unit cycles (according to the value of a counter) in accordance with priorities individually set for the processes, and image processing is performed in a fundamental cycle that is constituted of six unit cycles. A face direction determination process, a line-of-sight direction determination process, a blink detection process, a dozing determination process, and a consciousness deterioration level determination process are selectively performed depending on the value of the counter, which varies from 1 to 6. According to the image processing apparatus, it is possible to more efficiently perform image processing that involves a plurality of processes.

12 Claims, 12 Drawing Sheets

FOREIGN PATENT DOCUMENTS

| | | |
|---|---|---|
| JP | A 2001-307076 | 11/2001 |
| JP | A 2002-158982 | 5/2002 |
| JP | A 2003-15816 | 1/2003 |
| JP | A 2005-346301 | 12/2005 |
| WO | WO 02/09025 A1 | 1/2002 |

OTHER PUBLICATIONS

Salgian et al., "Developing Autonomous Navigation Algorithms using Photorealistic Simulation," IEEE Conference on Intelligent Transportation Systems, Nov. 9-12, 1997, pp. 882-887.

Laplante, "Real-Time Systems Design and Analysis," Chapter 3. Real-Time Operating Systems, Apr. 20, 2004, pp. 92-95.

European Oral Proceedings dated Nov. 5, 2010 issued in European Patent Application No. 08788970.5.

Apostoloff et al., "Vision in and Out of Vehicles: Integrated Driver and Road Scene Monitoring," *The International Journal of Robotics Research*, vol. 23, No. 4-5, Apr.-May 2004, pp. 513-538.

Petersson et al., "An interactive driver assistance system monitoring the scene in and out of the vehicle," Proceedings of the 2004 IEEE International Conference on Robotics & Automation, New Orleans, LA, Apr. 2004, pp. 3475-3481.

Search Report and Written Opinion issued for International Application No. PCT/IB2008/002003 on Feb. 25, 2009.

International Preliminary Report on Patentability issued for International Application No. PCT/IB2008/002003 on Jul. 13, 2009.

Office Action issued for Japanese Application No. 2007-124749 on Mar. 9, 2009.

\* cited by examiner

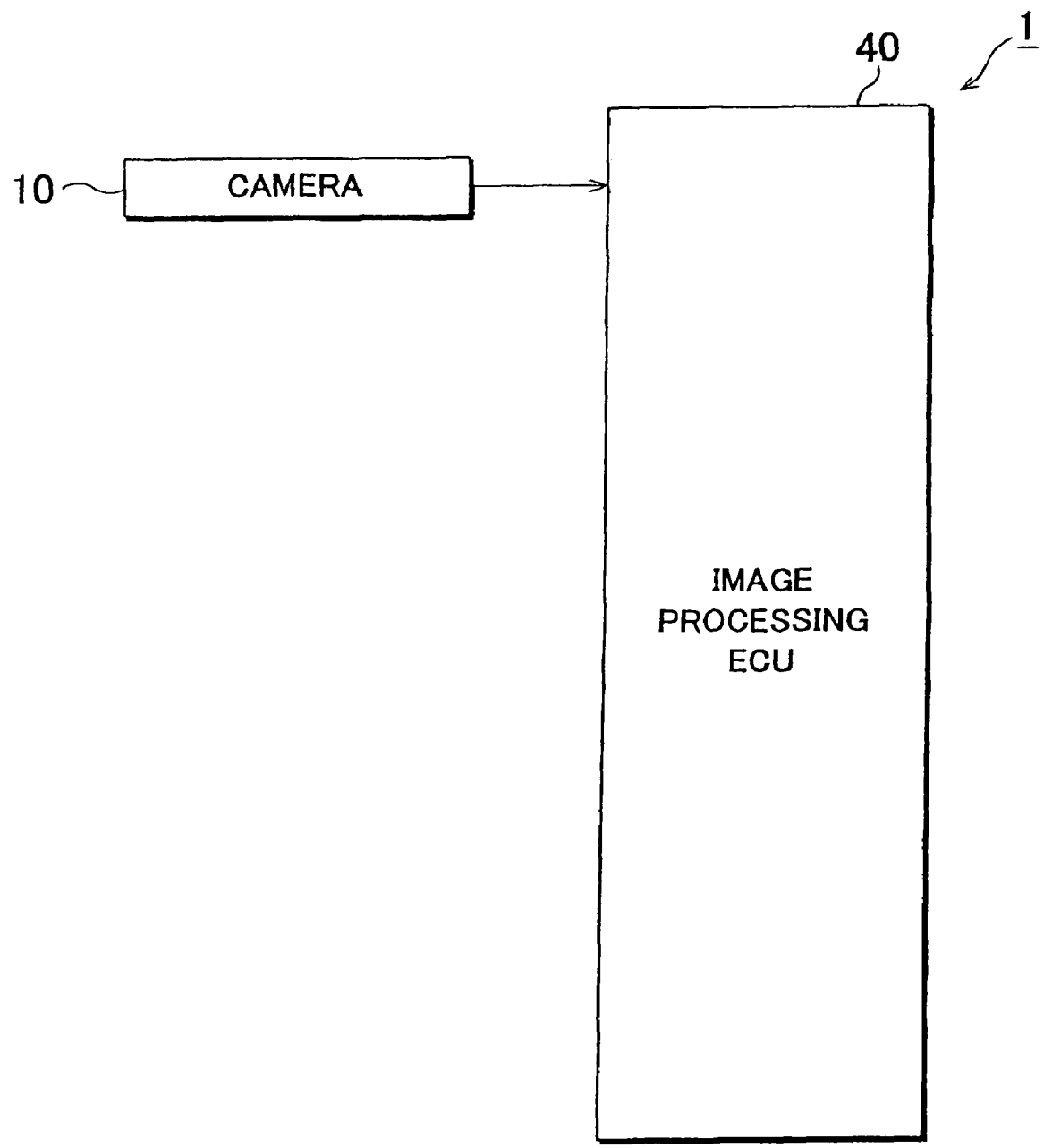

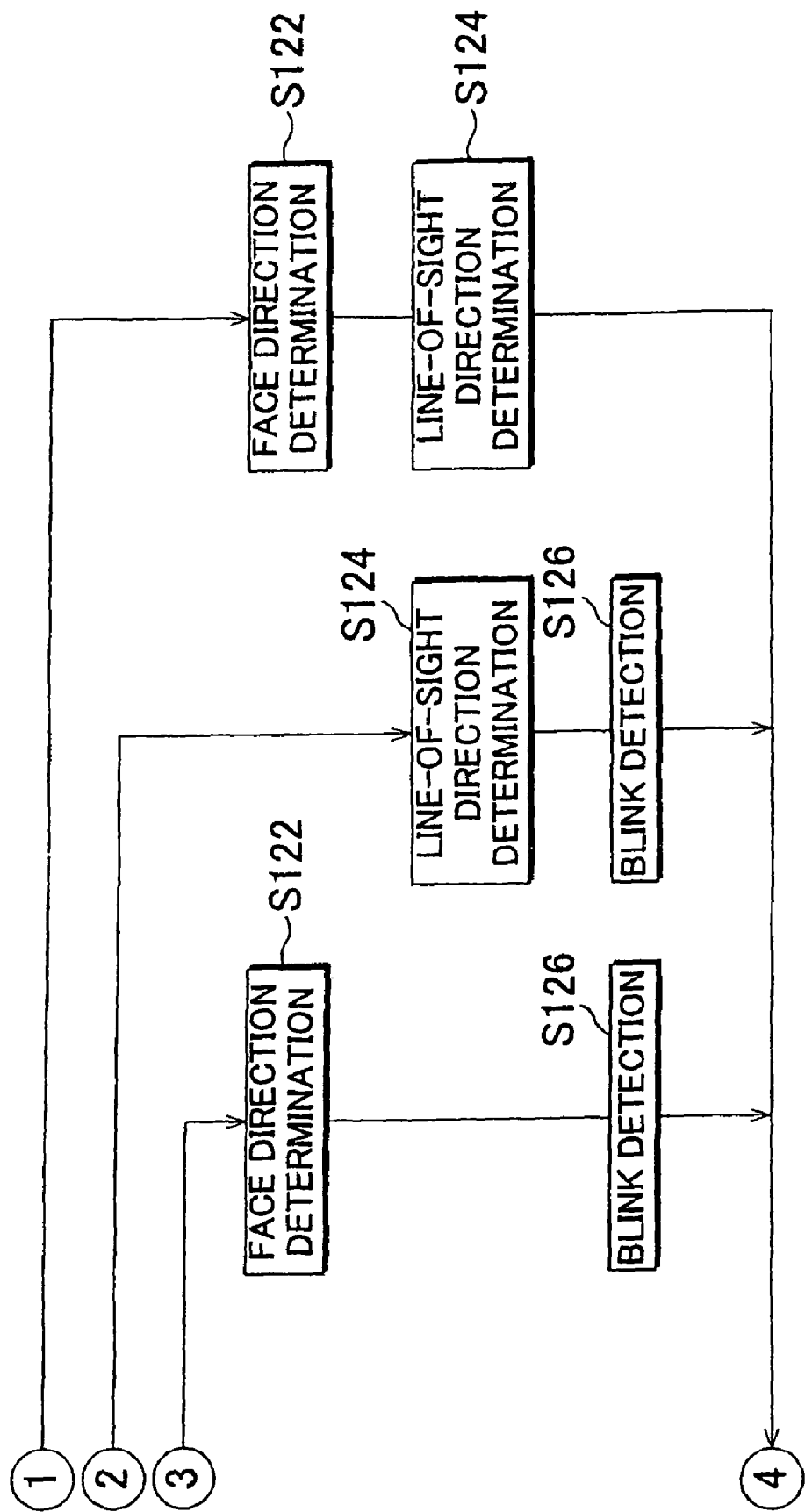

F I G. 6 A

| CLASS | ITEM | OTHER INFORMATION OBTAINED | FACE DIRECTION DETERMI- NATION | LINE-OF-SIGHT DETECTION | BLINK DETECTION | DOZING DETERMI- NATION | CONSCIOUSNESS DETERIORATION LEVEL DETERMINATION |
|---|---|---|---|---|---|---|---|
| KINETIC STATUS OF VEHICLE | DRIVING AT HIGH SPEED | VEHICLE SPEED | A | B | A | A | B |
| | DRIVING AT LOW SPEED | VEHICLE SPEED | A | A | B | B | B |
| | LATERAL ACCELERATION IS HIGH | LATERAL ACCELERATION, STEERING ANGLE | B | B | B | C | C |
| | LONGITUDINAL ACCELERATION IS HIGH | LONGITUDINAL ACCELERATION, ACCELERATOR PEDAL OPERATION AMOUNT, PEDAL DEPRESSION FORCE | B | | | C | C |

A: HIGH PRIORITY   B: MIDDLE PRIORITY   C: LOW PRIORITY (UPPER LIMIT VALUE OF COMPUTING POWER IS DEFINED BY THREE As + TWO Bs)

FIG. 6B

| CLASS | ITEM | OTHER INFORMATION OBTAINED | FACE DIRECTION DETERMINATION | LINE-OF-SIGHT DETECTION | BLINK DETECTION | DOZING DETERMINATION | CONSCIOUSNESS DETERIORATION LEVEL DETERMINATION |
|---|---|---|---|---|---|---|---|
| DRIVING ENVIRONMENT 1 | JAMMED ROAD (NO TRAFFIC SIGNAL) | VICS, MAP DATA | A | B | A | A | B |
| | JAMMED ROAD (HAVING TRAFFIC SIGNALS) | VICS, MAP DATA | A | A | B | B | B |
| | MOUNTAIN ROAD | MAP DATA | A | A | B | B | B |
| | STRAIGHT ROAD | MAP DATA | A | B | B | B | B |
| | NARROW ROAD/RESIDENTIAL STREET | MAP DATA | A | A | B | B | B |
| | MULTILANE ROAD | MAP DATA | A | B | B | B | C |
| | DRIVING ON HIGH SPEED WAY | MAP DATA | A | B | A | A | C |
| | DRIVING ON TOKYO METROPOLITAN EXPRESS WAY | MAP DATA | A | A | B | B | C |
| | TOLL ROAD/MOTOR VEHICLE ROAD | MAP DATA | A | B | A | A | C |

A: HIGH PRIORITY    B: MIDDLE PRIORITY    C: LOW PRIORITY (UPPER LIMIT VALUE OF COMPUTING POWER IS DEFINED BY THREE As + TWO Bs)

F I G. 6 C

| CLASS | ITEM | OTHER INFORMATION OBTAINED | FACE DIRECTION DETERMINATION | LINE-OF-SIGHT DETECTION | BLINK DETECTION | DOZING DETERMINATION | CONSCIOUSNESS DETERIORATION LEVEL DETERMINATION |
|---|---|---|---|---|---|---|---|
| DRIVING ENVIRONMENT 2 | INCIDENCE OF DIRECT SUNLIGHT | BRIGHTNESS OF FACE IMAGE DATA | A | B | B | C | C |
| | NIGHT DRIVING | GPS TIME (NAVIGATION SYSTEM) | A | B | A | A | C |
| | COMMUTING TIME | GPS TIME (NAVIGATION SYSTEM) | A | A | B | B | B |
| | VEHICLES AROUND HOST VEHICLE | RADAR | A | A | B | B | B |
| | PEDESTRIANS | RADAR/NIGHT VISION (NV) | A | A | B | B | B |

A: HIGH PRIORITY   B: MIDDLE PRIORITY   C: LOW PRIORITY (UPPER LIMIT VALUE OF COMPUTING POWER IS DEFINED BY THREE As + TWO Bs)

FIG. 6D

| CLASS | ITEM | OTHER INFORMATION OBTAINED | FACE DIRECTION DETERMINATION | LINE-OF-SIGHT DETECTION | BLINK DETECTION | DOZING DETERMINATION | CONSCIOUSNESS DETERIORATION LEVEL DETERMINATION |
|---|---|---|---|---|---|---|---|
| CONDITIONS OF DRIVER | WEARING GLASSES | GLASS DETECTION (INITIALIZING PROCESS) | A | B | B | B | C |
| | WEARING SUNGLASSES | SUNGLASS DETECTION (INITIALIZING PROCESS) | A | C | B | B | C |
| | EYES ARE COVERED WITH HAIR | HAIR CONDITIONS DETECTION | A | C | B | B | C |
| | WEARING HAT | HAT DETECTION | A | A | A | B | C |
| | ACCUSTOMED ROAD | PATH HISTORY PROVIDED BY NAVIGATION SYSTEM | A | B | A | A | B |
| | FIRST-TIME ROAD | PATH HISTORY PROVIDED BY NAVIGATION SYSTEM | A | A | B | B | B |

A: HIGH PRIORITY   B: MIDDLE PRIORITY   C: LOW PRIORITY (UPPER LIMIT VALUE OF COMPUTING POWER IS DEFINED BY THREE As + TWO Bs)

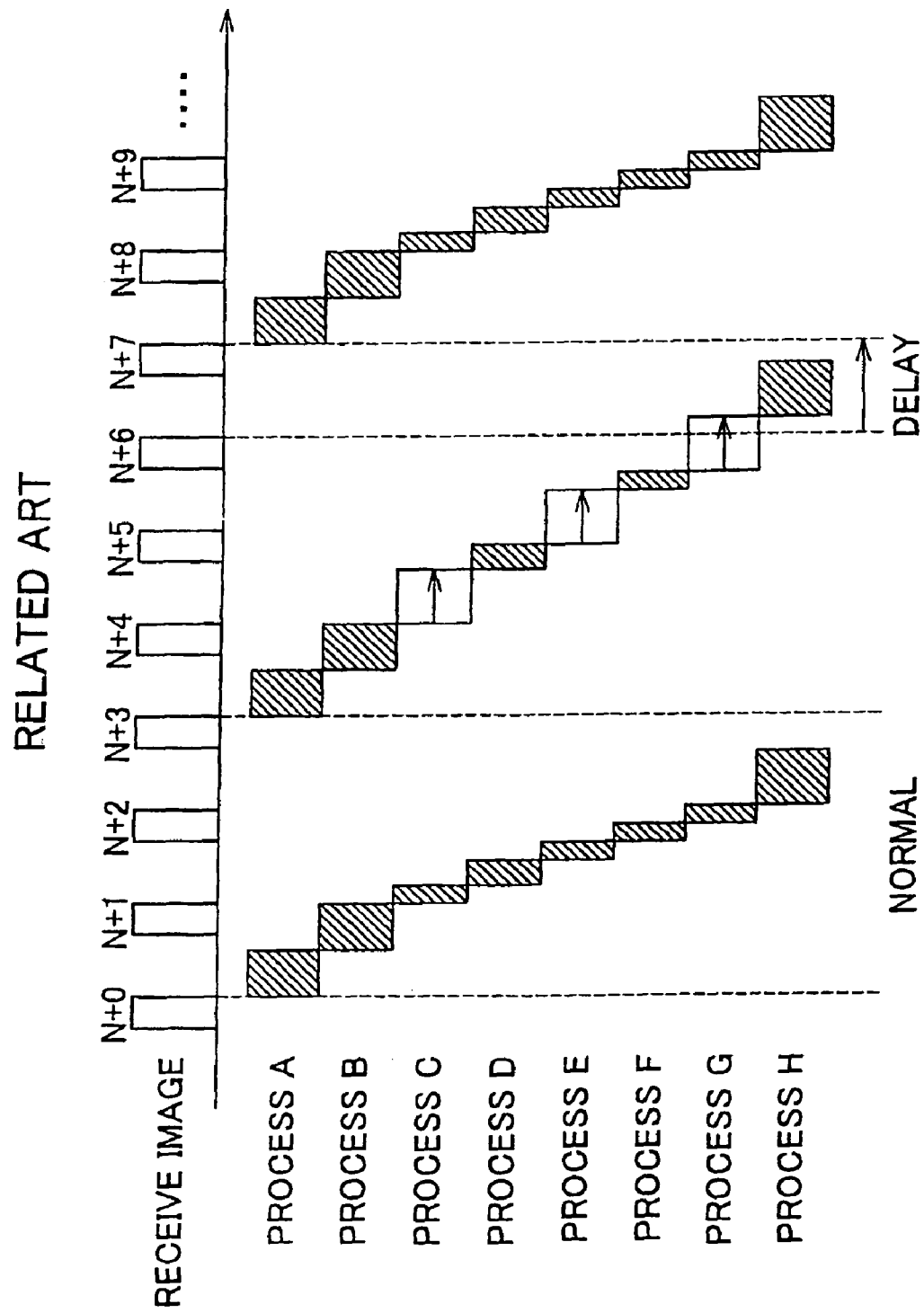

IMAGE PROCESSING APPARATUS AND IMAGE PROCESSING METHOD

BACKGROUND OF THE INVENTION

1. Field of the Invention

The invention relates to an image processing apparatus and an image processing method.

2. Description of the Related Art

Japanese Patent Application Publication No. 2003-15816 describes a face/line-of-sight recognition apparatus that detects the direction of the face and the line of sight of a user in real time by performing a series of processes, that is, face search, face tracking, blink detection, and line-of-sight direction determination, on the data of a user's face image picked up by a stereo camera. In this face/line-of-sight recognition apparatus, errors that cause wasted operation time are reduced to achieve high-speed image processing.

In the systems, such as pre-crash safety systems, in which real-time output of the image processing results is required, a series of processes must be completed within a predetermined period of time. However, even when errors are not occurring, the processing time of each process in image processing is not constant, but varies depending on, for example, the branching conditions and other interrupt processes (in particular, multiple interruptions) (see FIG. 8). Meanwhile, the importance and the required accuracy of a process vary depending on the process in many cases. Thus, also in view of the real-time processing and the required accuracy, it is difficult to say that it is efficient to indiscriminately perform all the processes.

SUMMARY OF THE INVENTION

The invention provides an image processing apparatus and an image processing method that more efficiently perform image processing involving a plurality of processes.

An image processing apparatus according to a first aspect of the invention is an image processing apparatus that performs image processing in a fundamental cycle by performing a plurality of processes on data of an image picked up by a camera means, the apparatus including: a process setting means for constituting the fundamental cycle, in which a series of the image processes are performed, from a plurality of unit cycles, and for selecting, from the plurality of processes, the processes that are performed and setting a combination of the selected processes for each of the plurality of unit cycles constituting the fundamental cycle, in accordance with a priority of each of the plurality of processes; and a processing means for performing each of the processes in accordance with the combination set by the process setting means.

The image processing apparatus according to the first aspect of the invention is configured not so that the plurality of processes that constitute the image processing are all indiscriminately performed with the same priority, but so that the combination of the performed processes is set for each unit cycle in accordance with the priorities individually set for the processes, and the image processing is performed every fundamental cycle that is constituted of a plurality of unit cycles. Accordingly, it is possible to achieve the optimum process combination within the limits of the processing cycle (processing time) in consideration of the priorities of the processes. As a result, it is made possible to efficiently perform image processing involving a plurality of processes. Such an image processing apparatus is capable of efficiently performing image processing. Thus, the image processing apparatus is useful especially when the available resources are limited, such as when used as an onboard image processing apparatus, and it is possible to obtain required information in real time.

The "processes" mean those performed to obtain "various pieces of information" from image data. The "various pieces of information" include information concerning detection of an object, information concerning determination of conditions of the object, and information concerning determination made using such information, for example. By setting the priorities of the processes that are performed to obtain the "various pieces of information" from the image data, and setting the combination of the processes that are performed for each of the plurality of unit cycles in accordance with the priorities, it is possible to efficiently perform the image processing.

The process setting means may select, from the plurality of processes, the processes that are performed and set the combination of the selected processes for each of the plurality of unit cycles so that the higher the priority of the process is, the higher the occupation rate of the process in the fundamental cycle is. When the occupation rate in the fundamental cycle is set so that the higher the priority of the process is, the higher the occupation rate of the process in the fundamental cycle is in this way, the number of times such a process(es) are performed and the processing time used for such a process(es) are increased, which makes it possible to efficiently perform image processing processes.

The process setting means may set the combination of the processes in consideration of processing time and required accuracy of each of the processes and/or the required number of times the processes are performed relative to the number of times the picked-up image is received within the fundamental cycle.

With this configuration, it is possible to set the combination of the processes in consideration of the importance of each process, the required frequency of updating the processing result, the processing load, and the required accuracy, which are criteria used in setting the priorities, so that it is possible to adjust the proportion of the processing load of each process to the whole processing load, according to the priorities of the processes.

The process setting means may set the combination of the processes so that the processes performed every unit cycle are completed within a single unit cycle.

In this case, the combination of the processes is set so that the processes complete within a unit cycle, and it is therefore possible to ensure real-time output of the image processing result.

In this case, the process setting means may set the combination of the processes so that the sum of the processing time of the processes that are performed within each unit cycle is less than the duration of a single unit cycle.

The process setting means may change the priorities of the processes, and select, from the plurality of processes, the processes that are performed for each of the unit cycles in accordance with the changed priorities. When the priorities are changed in this way, it is possible to efficiently perform the image processing in response to the importance and the required accuracy of the process with respect to the processes that depend on the changes in conditions.

The image processing apparatus may further include a driving status detection means for detecting driving status of a vehicle, the camera means may be installed in the vehicle, and the process setting means may set the priority of each of the processes based on the driving status of the vehicle detected by the driving status detection means, and select, from the plurality of processes, the processes that are performed for each of the unit cycles in accordance with the set priorities.

When the image processing is performed on the data of the image picked up by the camera means installed in the vehicle, the above-described priority and processing load of each process are affected by the driving status of the vehicle, such as the kinetic status of the vehicle and the driving environment. According to the image processing apparatus according to the first aspect of the invention, the priorities of the processes are set based on the driving status of the vehicle, and the processes that are performed are selected for each unit cycle in accordance with the set priorities. Thus, it is possible to set an appropriate priority for each process according to the picked-up image, and it is therefore possible to select the performed processes and set a combination of the processes for each unit cycle in accordance with the priorities. As a result, it is possible to more efficiently perform image processing involving a plurality of processes on the data of the image that is picked up by the camera means installed in the vehicle.

The image processing apparatus may further include a driver condition determination means for determining conditions of a driver, the image that is picked up by the camera means may be a face image of the driver; and the process setting means may set the priority of each of the processes based on the conditions of the driver determined by the driver condition determination means, and select, from the plurality of processes, the processes that are performed for each of the unit cycles in accordance with the set priorities.

When the image processing is performed on the data of the face image of the driver, the above-described priority and processing load of each process are affected by the conditions of the driver, such as the motion, the external features, and the personal features of the driver. According to the image processing apparatus according to the first aspect of the invention, the priorities of the processes are set based on the conditions of the driver, and the processes that are performed are selected for each unit cycle in accordance with the set priorities. Thus, it is possible to set an appropriate priority for each process according to the face image of the driver, and it is therefore possible to select the performed processes and set a combination of the processes for each unit cycle in accordance with the priorities. As a result, it is made possible to more efficiently perform image processing involving a plurality of processes on the image data of the face of the driver.

The process setting means may also take into account the face image of the driver picked up by the camera means in setting the priority of each of the processes.

When the image processing is performed on the data of the face image of the driver, the above-described priority and processing load of each process are affected by the face image of the driver, that is, the face direction, for example. According to the image processing apparatus according to the first aspect of the invention, the priorities of the processes are set with the image data of the face of a driver also taken into account, and it is therefore possible to set an optimum priority for each process, according to the image data of the individual face. As a result, it is made possible to more efficiently perform image processing involving a plurality of processes on the image data of the face of the driver.

According to the first aspect of the invention, the image processing apparatus that performs image processing every fundamental cycle by performing a plurality of processes on data of the received image is configured so that the processes that are performed are selected from the plurality of processes and a combination of such processes is set for each of the plurality of unit cycles constituting the fundamental cycle in accordance with a priority of each of the plurality of processes. Thus, it is made possible to more efficiently perform image processing involving a plurality of processes.

In an image processing method according to a second aspect of the invention, image processing is performed in a fundamental cycle, in which a plurality of processes are performed on data of an image picked. up by a camera means. The image processing method includes: selecting, from the plurality of processes, the processes that are performed and setting a combination of the selected processes for each of a plurality of unit cycles constituting the fundamental cycle, in accordance with a priority of each of the plurality of processes; and performing each of the processes in accordance with the set combination of the processes.

According to the second aspect of the invention, the image processing apparatus that performs image processing every fundamental cycle by performing a plurality of processes on data of the received image selects, from the plurality of processes, the processes that are performed and sets a combination of such processes for each of the unit cycles constituting the fundamental cycle in accordance with the priorities of the processes. Thus, it is made possible to more efficiently perform image processing involving a plurality of processes.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 1 is a block diagram showing a configuration of an image processing apparatus according to a first embodiment;

FIGS. 2A and 2B are flow charts showing processing procedures of image processing (first image processing) performed by the image processing apparatus according to the first embodiment;

FIGS. 6A to 6D are diagrams showing an example of kinetic status of a vehicle, driving environment, conditions of a driver, and priorities of processes;

FIG. 8 is a diagram showing processing timing and processing time of each process of conventional image processing.

DETAILED DESCRIPTION OF EMBODIMENTS

Figure 2A:
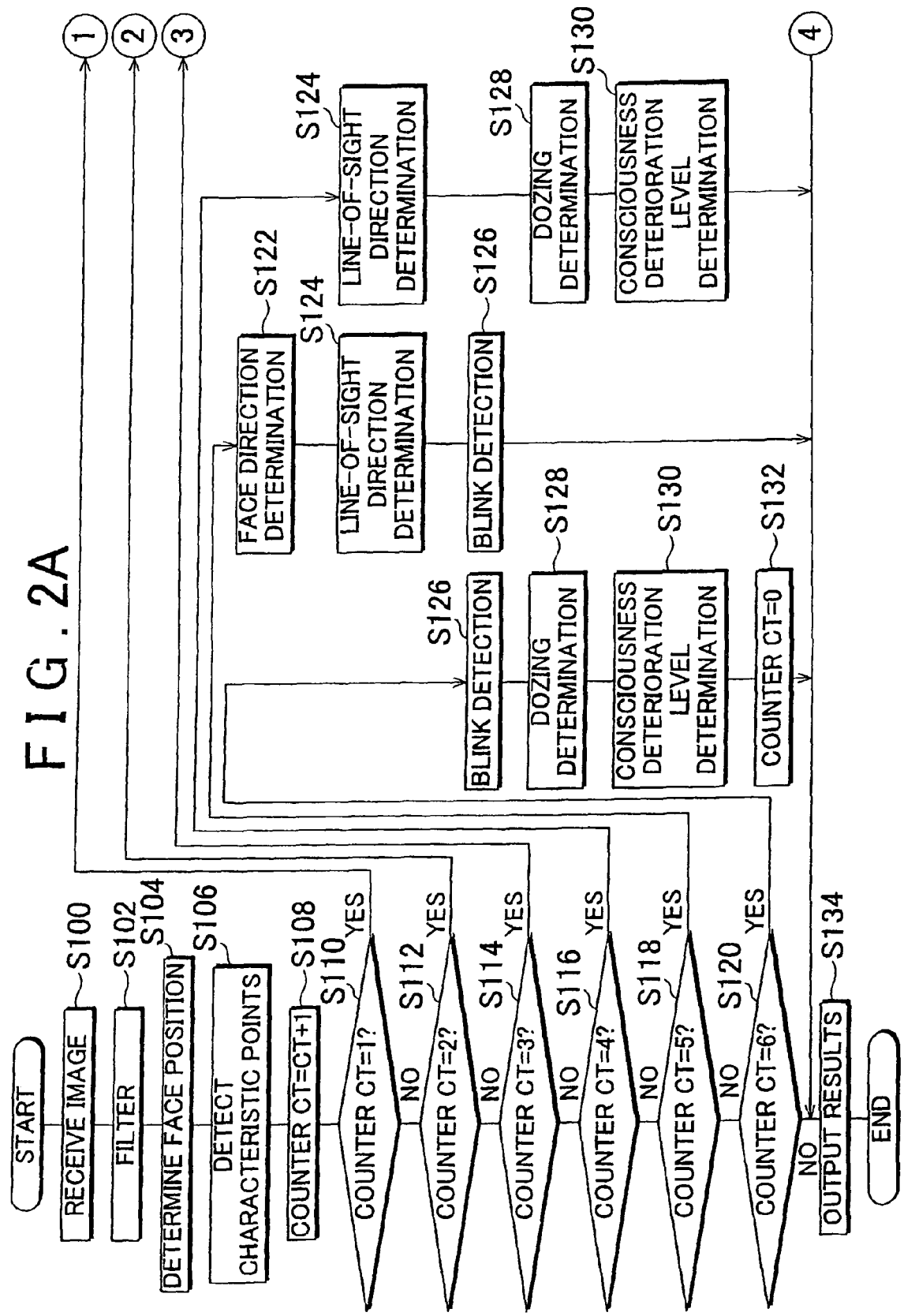

Example embodiments of the invention will be described in detail below with reference to drawings. In the drawings, the same or corresponding elements are designated by the same reference characters. The description will be given of a case where apparatuses according to embodiments of the invention are installed in a vehicle and determine sleepiness of a driver based on a picked-up face image of the driver, by way of example.

First, with reference to FIG. 1, a configuration of an image processing apparatus 1 according to a first embodiment will be described. FIG. 1 is a block diagram showing the configuration of the image processing apparatus 1.

The image processing apparatus 1 is installed in a vehicle. The image processing apparatus 1 detects the direction of a driver's face, a driver's line-of-sight direction, and a driver's blink by performing image processing on the data of the picked-up face image of the driver, and determines whether the driver is dozing and the level of deterioration in consciousness of the driver based on the results of the detection. For this purpose, the image processing apparatus 1 includes a camera 10 for picking up a face image of the driver, and an image processing ECU (Electronic Control Unit) 40.

The camera 10 is used to obtain an image of the area including the face of the driver. The camera 10 is installed in an instrument panel or a steering column, directed toward the face of the driver. The camera 10 picks up an image every predetermined period of time (1/30 second, for example), and sends the image data of each frame to the image processing ECU 40 as a video signal. In order to obtain a clear image, the apparatus may include an LED light.

The image processing ECU 40 includes: a microprocessor that performs calculation; a ROM that stores programs for causing the microprocessor to perform various processes; a RAM that stores various data, such as results of calculation; and a backup RAM whose memory content is maintained by a battery, etc.

The image processing ECU 40 reads the data of a driver's face image that is picked up by the camera 10, and performs the driver's dozing determination and/or the driver's consciousness deterioration level determination by repeatedly performing on the read data in a fundamental cycle (600 ms, for example) image processing (initializing process and image receiving process, filtering process and characteristic-point detection process, face direction determination process, line-of-sight direction determination process, blink detection process, dozing determination process, consciousness deterioration level determination process, and output process and diagnosis process). It should be noted that one process may be performed a plurality of times within the fundamental cycle.

When this is performed, from the plurality of processes (face direction determination process, line-of-sight direction determination process, blink detection process, dozing determination process, and consciousness deterioration level determination process), which are involved in the image processing, the image processing ECU 40 selects the processes that are performed and sets a combination of the processes for each of the six unit cycles (100 ms, for example) that constitute the fundamental cycle, in accordance with the priorities of the processes, and performs each of the processes according to the combination. The image processing ECU 40 sets the combination of the processes so that the processes performed every unit cycle are completed within a single unit cycle. Specifically, the combination of the processes is set so that the sum of the processing time of the processes that are performed within each unit cycle is less than the duration of a single unit cycle. Thus, the image processing ECU 40 may be regarded as the process setting means and the processing means of the invention. The initializing process and the image receiving process, the filtering process and the characteristic-point detection process, and the output process and the diagnosis process are performed every unit cycle.

Figure 3:
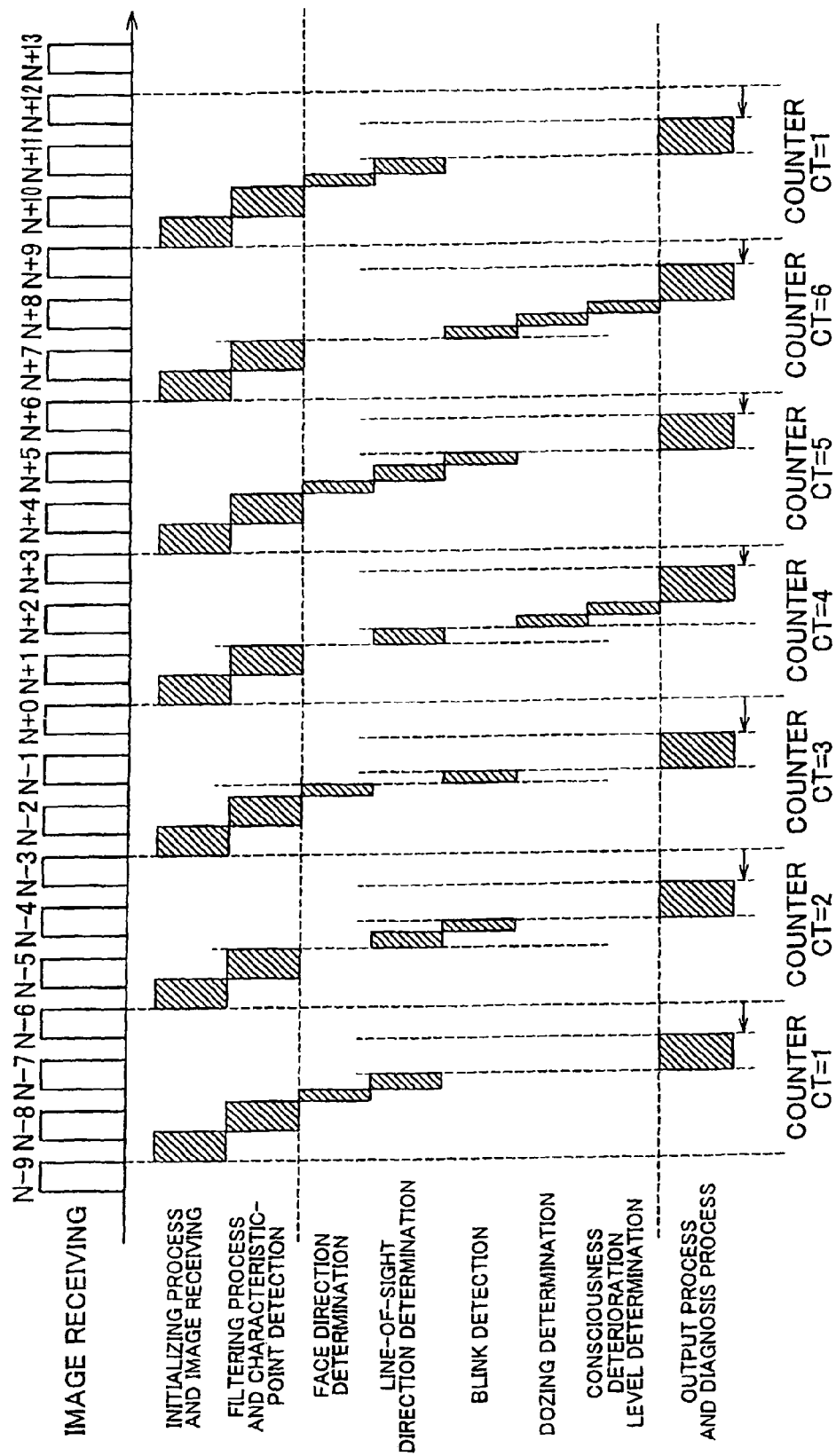
FIG. 3 is a diagram showing processing timing and processing time of each process of the first image processing.

Next, operation of the image processing apparatus 1 will be described with reference to FIGS. 2A, 2B and 3. FIGS. 2A, 2B are flow charts showing processing procedures of the image processing (hereinafter, referred to as the "first image processing") performed by the image processing apparatus 1. This processing, performed by the image processing ECU 40, is repeatedly performed in a predetermined cycle (100 ms, for example) from when the image processing ECU 40 is turned on to when the image processing ECU 40 is turned off. FIG. 3 is a diagram showing the processing timing and the processing time of each process of the first image processing.

In step S100, the data of a driver's face image that is picked up by the camera 10 is read. Subsequently, in step S102; the read face image data is subjected to a filtering process.

Subsequently, in step S104, the position of the driver's face is determined based on the obtained face image data. The face position is determined by performing edge detection and pattern recognition in combination.

Next, in step S106, the characteristic points in the face whose position is determined in step S104 are detected. The characteristic points of a face are the points that are positioned at the boundaries between the skin and each of the outer corners of the eyes, each of the inner corners of the eyes, each of the right and left nostrils, and each of the right and left corners of the mouth, for example, and therefore, are the points at which there is evident difference in the image data, such as brightness and color.

Subsequently, in step S108, the value of the counter CT whose value varies from 1 to 6 and that is used to perform the processes set for each unit cycle is incremented by one. Thus, the value of the counter CT is incremented by one every time the processing is performed, and, when the count of 6 is reached, the value of the counter CT is reset to zero (step S132 described later).

In subsequent step S110, it is determined whether the value of the counter CT is "1". When the value of the counter CT is "1", the face direction determination (step S122) and the line-of-sight direction determination (step S124) are performed, and the processing then proceeds to step S134 (see the case of "counter CT=1" in FIG. 3). In the face direction determination (step S122), the position of the center of the face (the line passing through the tip of the nose) and the positions of both sides of the face are detected from the obtained image data by using established methods, such as edge detection, in combination, and the face direction is calculated based on the positions of the center and both sides of the face. In the line-of-sight direction determination (step S124), the line of sight of the driver is detected based on the characteristic points obtained in step S106. More specifically, the line of sight is determined using the change in the relative positions between the center of the iris of the eye and the characteristic points at the corners of the eye. It should be noted that the face direction and the line-of-sight direction are defined such that the direction that coincides with the forward direction of the host vehicle has the angle of zero, the direction on the right side of the forward direction has a positive angle, and the direction on the left side of the forward direction has a negative angle. On the other hand, when the value of the counter CT is not "1", the processing proceeds to step S112.

In step S112, it is determined whether the value of the counter CT is "2". When the value of the counter CT is "2", the line-of-sight determination (step S124) and the blink detection (step S126) are performed, and the processing then proceeds to step S134 (see the case of "counter CT=2" in FIG. 3). The line-of-sight direction determination is as described above, and therefore description thereof will be omitted. In the blink detection (step S126), the change in, of the characteristic points detected in step S106, the characteristic points related to the eyes at which a change is made due to sleepiness, that is, a blink, is detected. When the value of the counter CT is not "2", the processing proceeds to step S114.

In step S114, it is determined whether the value of the counter CT is "3". When the value of the counter CT is "3", the face direction determination (S122) and the blink detection (step S126) are performed, and the processing then proceeds to step S134 (see the case of "counter CT=3" in FIG. 3). The face direction determination and the blink detection are as described above, and therefore description thereof will be omitted. When the value of the counter CT is not "3", the processing proceeds to step S116.

In step S116, it is determined whether the value of the counter CT is "4". When the value of the counter CT is "4", the line-of-sight direction determination (step S124), the dozing determination (step S128), and the consciousness deterioration level determination (step S130) are performed, and the processing then proceeds to step S134 (see the case of "counter CT=4" in FIG. 3). The line-of-sight direction determination is as described above, and therefore description thereof will be omitted. In the dozing determination (step S128), based on the line-of-sight direction determined in step S124 and the blink detected in step S126, it is determined that the driver is dozing when, for example, it is determined that the eyes of the driver have been closed for more than a predetermined period of time. In the consciousness deterioration level determination (step S130), based on the blink detected in step S126, it is determined whether the consciousness of the driver is deteriorated. More specifically, the focus is placed on the blink (in particular, successive blinks: a plurality of blinks that are performed at intervals shorter than the normal intervals of blinks), and, when successive blinks are detected, it is determined that the consciousness of the driver is deteriorated. When the value of the counter CT is not "4", the processing proceeds to step S118.

In step S118, it is determined whether the value of the counter CT is "5". When the value of the counter CT is "5", the face direction determination (step. S122), the line-of-sight direction determination (step S124), and the blink detection (step S126) are performed, and the processing then proceeds to step S134 (see the case of "counter CT=5" in FIG. 3). The face direction determination, the line-of-sight direction determination, and the blink detection are as described above, and therefore description thereof will be omitted. When the value of the counter CT is not "5", the processing proceeds to step S120.

In step S120, it is determined whether the value of the counter CT is "6". When the value of the counter CT is "6", the blink detection (step S126), the dozing determination (step S128), and the consciousness deterioration level determination (step S130) are performed, and the value of the counter CT is then reset to zero (see the case of "counter. CT=6" in FIG. 3). Thereafter, the processing proceeds to step S134. The blink detection, the dozing determination, and the consciousness deterioration level determination are as described above, and therefore description thereof will be omitted. When the value of the counter CT is not "6", the processing proceeds to step S134.

In step S134, after one of the above-described sets of processes is performed, the result thereof is output. Then, the processing is repeatedly performed in a predetermined unit cycle.

According to this embodiment, each step is performed as described above, so that: the face direction determination and the line-of-sight direction determination are performed in the case of "counter CT=1"; the line-of-sight direction determination and the blink detection are performed in the case of "counter CT=2", and the face direction determination and the blink detection are performed in the case of "counter CT=3", as shown in FIG. 3. The line-of-sight direction determination, the dozing determination, , and the consciousness deterioration level determination are performed in the case of "counter CT=4", the face direction determination, the line-of-sight direction determination, and the blink detection are performed in the case of "counter CT=5", and the blink detection, the dozing determination, and the consciousness deterioration level determination are performed in the case of "counter CT=6".

Thus, this embodiment is configured not so that the plurality of processes (five processes in this embodiment) that constitute the image processing are all indiscriminately performed with the same priority, but so that the combination of the performed processes is set for each unit cycle (according to the value of the counter CT) in accordance with the priorities individually set for the processes, and the image processing is performed every fundamental cycle that is constituted of six unit cycles. Accordingly, it is possible to achieve the optimum process combination within the limits of the processing cycle (processing time) in consideration of the priorities of the processes. As a result, it is made possible to efficiently perform image processing involving a plurality of processes.

According to this embodiment, it is possible to set the combination of the processes in advance in consideration of the importance of each process, the required frequency of updating the processing result, the processing load and the required accuracy, which are criteria used in setting the priorities, so that it is possible to adjust the proportion of the processing load of each process to the whole processing load, according to the priorities of the processes.

In addition, according to this embodiment, the combination of the processes is set so that the processes performed in each unit cycle complete within a single unit cycle, and it is therefore possible to ensure real-time output of the image processing result.

Although, in the above-described first embodiment, the priority of each process and the combination of the processes are predetermined, it is also possible to adopt a configuration in which the priority of each process and the combination of the processes are varied depending on the driving status of the vehicle and the status of the driver.

Figure 4:
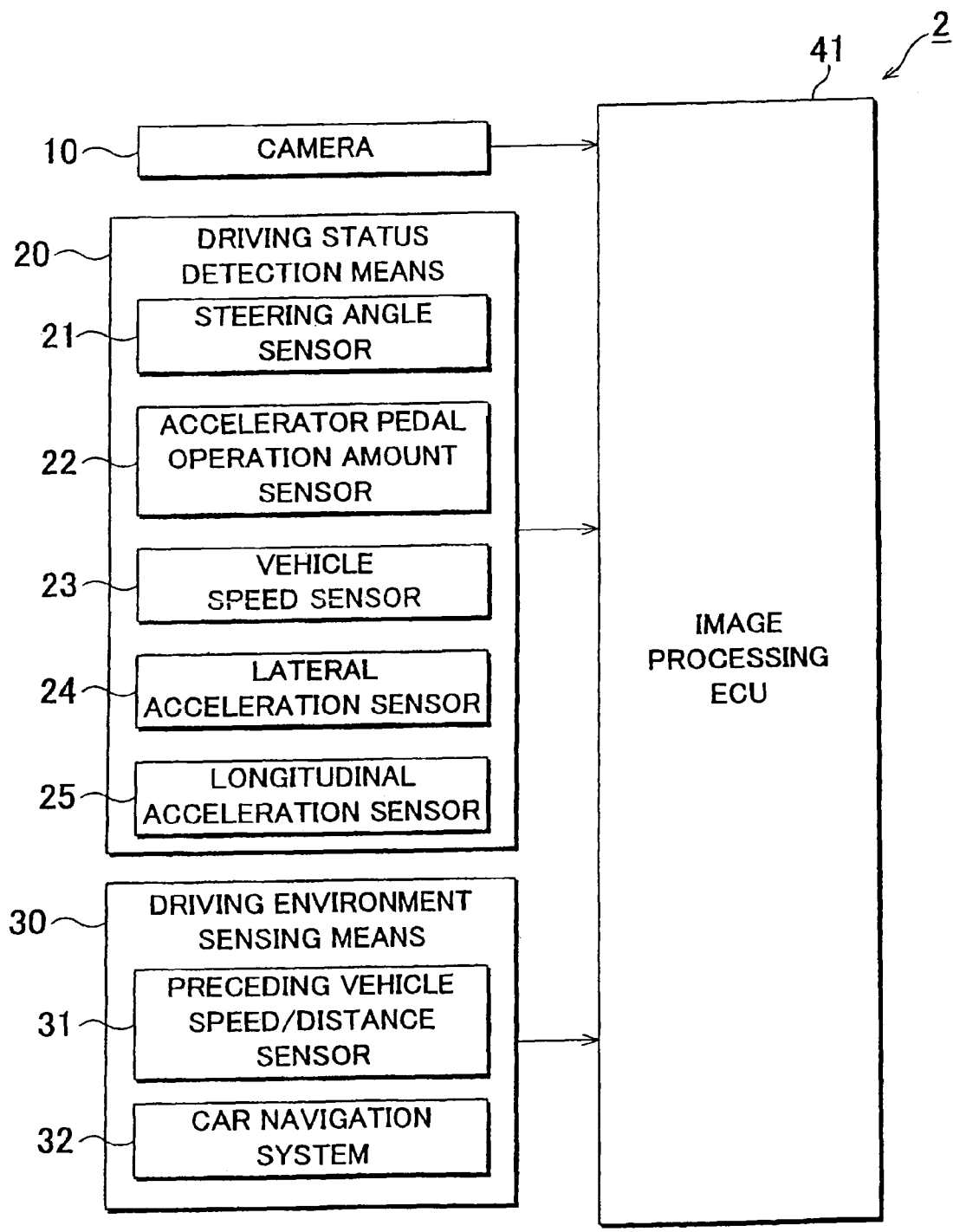
FIG. 4 is a block diagram showing a configuration of an image processing apparatus according to a second embodiment.

Next, with reference to FIG. 4, a configuration of an image processing apparatus 2 according to a second embodiment will be described. FIG. 4 is a block diagram showing the configuration of the image processing apparatus 2. In FIG. 4, the components the same as or similar to those of the first embodiment are designated by the same reference characters.

The image processing apparatus 2 differs from the above-described image processing apparatus 1 in further including a driving status detection means 20 that detects the driving status of the vehicle, and a driving environment sensing means 30 that senses the environment of the road on which the vehicle is running.

In addition, the second embodiment differs from the above-described first embodiment in that an image processing ECU 41, which is a component of the image processing apparatus 2, sets the priority for each process based on the driving status of the vehicle that is detected by the driving status detection means 20 and/or the driving environment sensing means 30, and the image processing ECU 41 selects, from the above-described plurality of processes, the processes that are performed for each unit cycle in accordance with the set priorities. Other components are the same as or similar to the corresponding ones of the above-described first embodiment, and therefore description thereof will be omitted.

The driving status detection means 20 includes a steering angle sensor 21, an accelerator pedal operation amount sensor 22, a vehicle speed sensor 23, a lateral acceleration sensor 24, and a longitudinal acceleration sensor 25, for example. The steering angle sensor 21 is a sensor that detects the steering angle of a steering wheel, and outputs the detected value to the image processing ECU 41. The accelerator pedal operation amount sensor 22 is a sensor that detects the amount of operation of an accelerator pedal, and outputs the detected value to the image processing ECU 41. The vehicle speed sensor 23 is a sensor that detects the speed of the vehicle, and outputs the detected value to the image processing ECU 41. The lateral acceleration sensor 24 is a sensor that detects the lateral acceleration of the vehicle, and outputs the detected value to the image processing ECU 41.

The driving environment sensing means 30 includes a preceding-vehicle speed/distance sensor 31 and a car navigation system 32. The preceding-vehicle speed/distance sensor 31 senses whether there is a preceding vehicle based on the radar data for the area ahead of the host vehicle provided by a radar, and, when there is a preceding vehicle, the preceding-vehicle speed/distance sensor 31 senses the speed of the preceding vehicle and the distance to the preceding vehicle and outputs the sensing result information to the image processing ECU 41. The car navigation system 32 is a system that, for example, detects the current position and the driving direction of the vehicle and provides guidance on the route to the destination, and outputs such data to the image processing ECU 41. In addition, the car navigation system 32 outputs information on the road around the current position to the image processing ECU 41. The road information includes traffic jam information, traffic-signal information, the form of intersections, and the number of lanes, for example. As can be seen from this description, the driving status detection means 20 and the driving environment sensing means 30 may be regarded as the driving status detection means of the invention.

Figure 5:
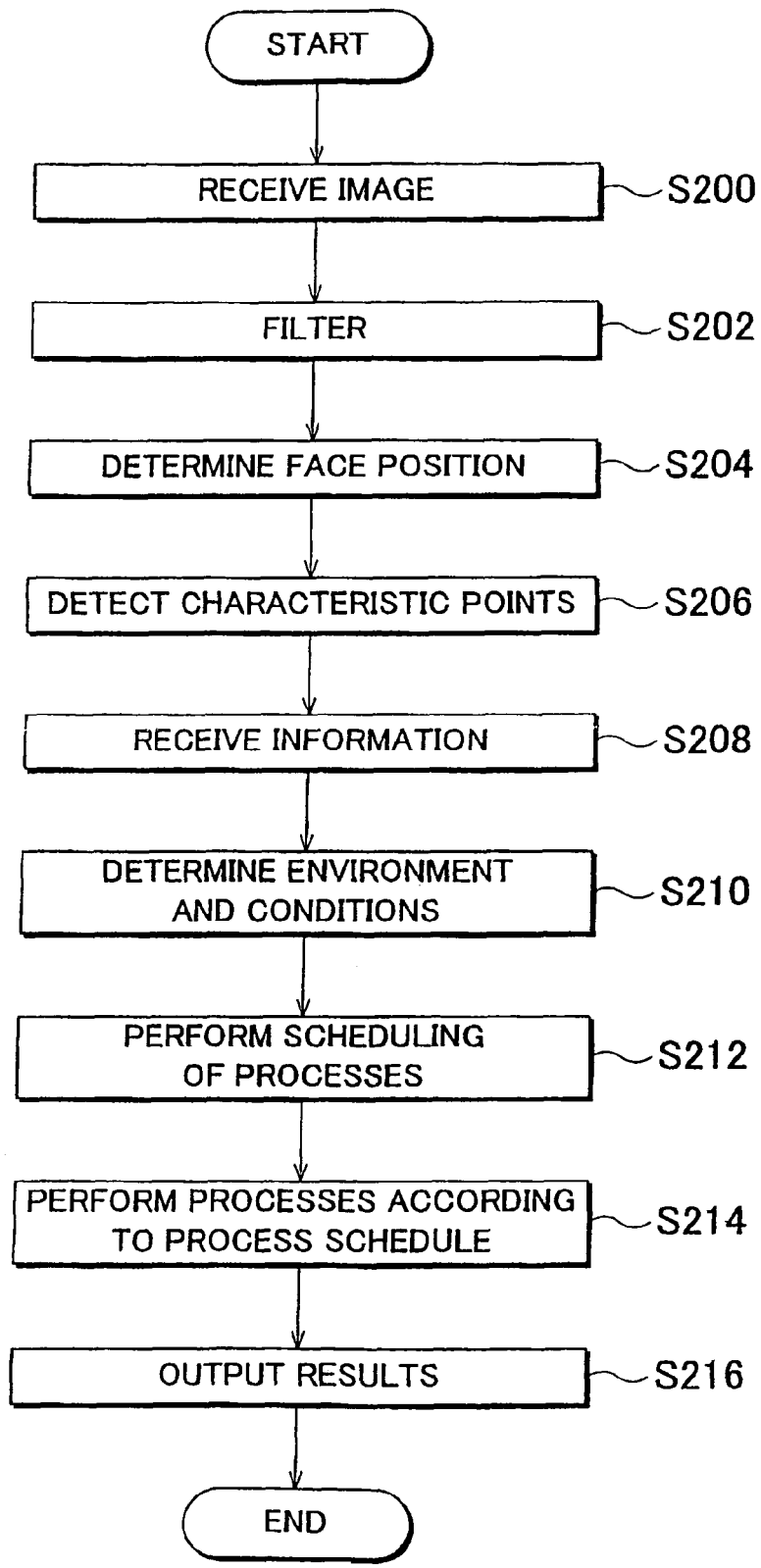
FIG. 5 is a flow chart showing a processing procedure of image processing (second image processing) performed by the image processing apparatus according to the second embodiment.

Next, operation of the image processing apparatus 2 will be described with reference to FIGS. 5 and 6A to 6D. FIG. 5 is a flow chart showing a processing procedure of the image processing (hereinafter, referred to as the "second image processing") performed by the image processing apparatus 2. This processing, performed by the image processing ECU 41, is repeatedly performed in a predetermined cycle (100 ms, for example) from when the image processing ECU 41 is turned on to when the image processing ECU 41 is turned off. FIGS. 6A to 6D are diagrams showing the processing timing and the processing time of each process in the second image processing.

Because steps S200 to S206 are the same as the above-described steps S100 to S106, description thereof will be omitted.

Subsequently, in step S208, the detection results showing the driving status of the vehicle that are obtained by the driving status detection means 20 and the driving environment sensing means 30 are read. In addition, conditions of the driver are read. The conditions of the driver are determined based on the picked-up image of the driver. In this case, the camera 10 and the image processing ECU 41 may be regarded as the driver condition determination means of the invention.

In the subsequent step S210, the kinetic status of the vehicle, driving environment, and the conditions of the driver are determined and classified based on the various data read in step S208. An example of the classification is shown in FIGS. 6A to 6D. As shown in FIGS. 6A to 6D, classes include "Kinetic Status of Vehicle", "Driving Environment 1", "Driving Environment 2", and "Conditions of Driver". Under the class "Kinetic Status of Vehicle", there are items, such as "Driving at High Speed", "Driving at Low Speed", "Lateral Acceleration is High", and "Longitudinal Acceleration is High". Under the class "Driving Environment 1", there are items, such as "Jammed Road (no traffic signal)", "Jammed Road (having traffic signals)", "Mountain Road", "Straight Road", "Narrow Road/Residential Street", "Multilane Road", "Driving on High Speed Way", "Driving on Tokyo Metropolitan Expressway", and "Toll Road/Motor Vehicle Road". Under the class "Driving Environment 2", there are items, such as "Incidence of Direct Sunlight", "Night Driving", "Commuting Time", "Vehicles around Host Vehicle", and "Pedestrians". Under the class "Conditions of Driver", there are items, such as "Wearing Glasses", "Wearing Sunglasses", "Eyes are Covered with Hair", "Wearing Hat", "Accustomed Road", and "First-Time Road".

Determination concerning the items "Driving at High Speed" and "Driving at Low Speed" is made based on the result of detection by the vehicle speed sensor 23, determination concerning the item "Lateral Acceleration is. High" is made using the lateral acceleration sensor 24, and determination concerning the item "Longitudinal Acceleration is High" is made based on the result of detection by the longitudinal acceleration sensor 25 and the accelerator pedal operation amount sensor 22. Determination concerning the items "Jammed Road (no traffic signal)" and "Jammed Road (having traffic signals)" is made based on VICS (Vehicle Information and Communication System) information and map data provided by the car navigation system 32. Determination concerning the items "Mountain Road", "Straight Road", "Narrow Road/Residential Street", "Multilane Road", "Driving on High Way", "Driving on Tokyo Metropolitan Expressway", and "Toll Road/Motor Vehicle Road" is made based on the map data provided by the car navigation system 32. Determination concerning the item "Incidence of Direct Sunlight" is made based on the brightness of the face image data, determination concerning the items "Night Driving" and "Commuting Time" is made based on the time data provided by the car navigation system 32, and determination concerning the items "Vehicles around Host Vehicle" and "Pedestrians" is made based on the result of detection by the preceding-vehicle speed/distance sensor 31. Determination concerning the items "Wearing Glasses", "Wearing Sunglasses", "Eyes are Covered with Hair", and "Wearing Hat" is made based on the face image data, and determination concerning the items "Accustomed Road" and "First-Time Road" is made based on the vehicle path history data provided by the car navigation system 32.

Subsequently, in step S212, scheduling of the processes performed within each unit cycle is performed. More specifically, the priority of each process is set based on, for example, the kinetic status of the vehicle, driving environment, and the conditions of the drive that are determined and classified in step S210, and the processes that are performed within each unit cycle are selected and the combination is set in accordance with the set priorities. An example of the relations between the above-described items and the priorities of the processes (face direction determination, line-of-sight direction determination, blink detection, dozing determination, and consciousness deterioration level determination) is shown in FIGS. 6A to 6D. For example, when it is determined that the vehicle is in the "Driving at High Speed" state, the priorities of the processes, the face direction determination, the line-of-sight direction determination, the blink detection, the dozing determination, and the consciousness deterioration level determination, are "A", "B", "A", "A" and "B", respectively. In FIGS. 6A to 6D, the priorities of the processes satisfy "A">"B">"C".

A method of scheduling the processes will be described with respect to the case where it is determined that the conditions for the "Driving at High Speed" and "Lateral Acceleration is High" are satisfied with respect to the kinetic status of the vehicle, that the conditions for the "Tokyo Metropolitan Expressway" are satisfied with respect to the driving environment 1, that the conditions for the "Night Driving" and "Vehicles around Host vehicle" are satisfied with respect to the driving environment 2, and that the conditions for the "Wearing Glasses" are satisfied with respect to the conditions of the driver, by way of example.

As described above, when it is determined that the vehicle is in the "Driving at High Speed" state, the priorities of the face direction determination process, the line-of-sight direction determination process, the blink detection process, the dozing determination process, and the consciousness deterioration level determination process, are "A", "B", "A", "A" and "B", respectively. Similarly, when it is determined that the vehicle is in the "Lateral Acceleration is High" state, the priorities of the face direction determination process, the line-of-sight direction determination process, the blink detection process, the dozing determination process, and the consciousness deterioration level determination process, are "B", "B", "B", "C" and "C", respectively. Similarly, the priorities of the processes are read for each of the items "Driving on Tokyo Metropolitan Expressway", "Night Driving", "Vehicles around Host Vehicle", and "Wearing Glasses".

Next, the priority of each process in the case where the conditions for the items "Driving at High Speed", "Lateral Acceleration is High", "Driving on Tokyo Metropolitan Expressway", "Night Driving", "Vehicles around Host Vehicle", and "Wearing Glasses" are satisfied is determined. More specifically, because, with respect to the "face direction determination", for example, the priorities of the items "Driving at High Speed", "Lateral Acceleration is High", "Driving on Tokyo Metropolitan Expressway", "Night Driving", "Vehicles around Host Vehicle", and "Wearing Glasses" are "A", "B", "A", "A", "A", and "A", respectively, the calculation of the mean value, in which it is assumed that the points of A, B and C are 4, 2 and 1, respectively, results in (4+2+4+4+4+4)/6≈3.7. When it is assumed that the priority of the process of which the mean value is equal to or greater than 3 is "A", that the priority of the process of which the mean value is equal to or greater than 2 and less than 3 is "B", and that the priority of the process of which the mean value is less than 2 is "C", the priority of the "face direction determination" process is determined to be "A".

Similarly, with respect to the "line-of-sight direction determination", for example, the priorities of the items "Driving at High Speed", "Lateral Acceleration is High", "Driving on Tokyo Metropolitan Expressway", "Night Driving", "Vehicles around Host Vehicle", and "Wearing Glasses" are "B", "B", "A", "B", "A", and "B", respectively. Thus, the mean value is (2+2+4+2+4+2)/6≈2.7. Thus, the priority of the "line-of-sight direction determination" process is determined to be "B". When the priorities of the processes are determined similarly, the priorities of the "blink detection" process, the "dozing determination" process, and the "consciousness deterioration level determination" process are "A", "B", and "C", respectively.

The scheduling of the processes is performed based on the calculated priorities of the processes. An example of the scheduling method will be described. The combination (scheduling) of the processes adopted in the above-described first embodiment is set as a default. On top of that, the rule for assignment according to the process priorities (A, B and C) is defined as follows: the occupation rate in each fundamental cycle (six unit cycles) is equal to or greater than 66% when the priority is "A", about 50% when the priority is "B", and equal to or less than 30% when the priority is "C". The processes are assigned to each of the six unit cycles so that the processes with the priority "A" are performed four times or more, the processes with the priority "B" are performed three times, and the processes with the priority "C" are performed two times (so that the higher the priority of the process is, the higher the occupation rate of the process is).

In this embodiment, the upper limit value of the computing power of the processor is 3 for the process with the priority "A", and 2 for the process with the priority "B". In this case, because of the calculation result, 3*66(%)+2*50(%)=3*(4/6)+2*(3/6)=3, the processes, each having one of the priorities "A", "B", and "C", are assigned so that this value is not exceeded. In the case of this embodiment, the priorities of the "face direction determination" process, the "line-of-sight direction determination" process, the "blink detection" process, the "dozing determination" process, and the "consciousness deterioration level determination" process are "A", "B", "A", "B", and "C", respectively, and the mean value is therefore calculated as follows: 2*(4/6)+2*(3/6)+1*(2/6)≈2.7. Thus, because this value does not exceed the upper limit value of the computing power, and it is determined that there is no problem with the calculation cycle and the scheduling.

Subsequently, in step S214, the processes are performed according to the process schedule of each unit cycle set in step S212. Each of the processes of each unit cycle is performed in a similar way to that of the first embodiment (steps S108 to S132). The method is as described above, and therefore detailed description thereof will be omitted.

Next, the result of processing is output in step S216, and the processing temporarily exits. Then, the processing is repeatedly performed in a predetermined fundamental cycle.

Figure 7:
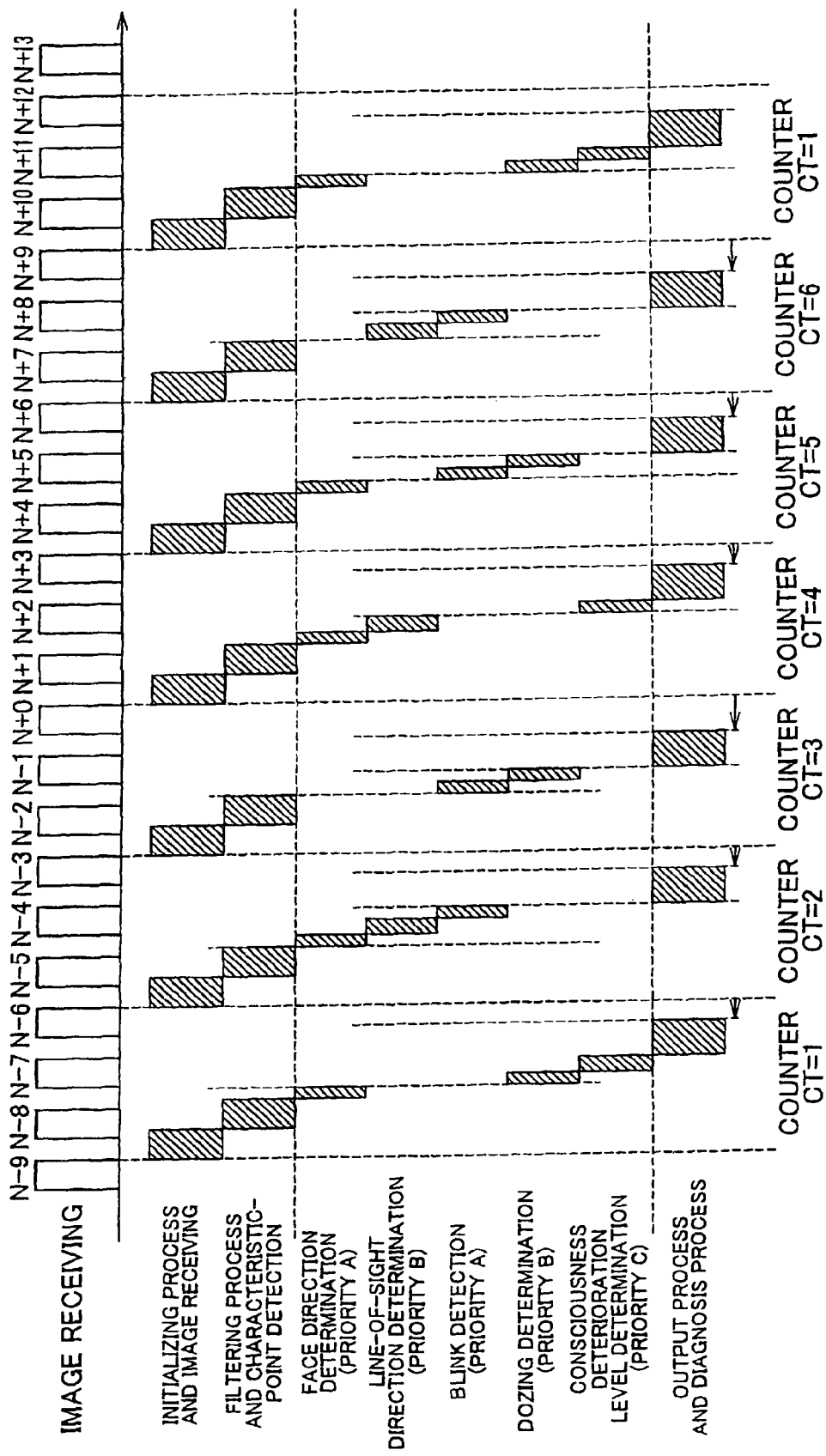
FIG. 7 is a diagram showing processing timing and processing time of each process of the second image processing.

According to this embodiment, the priorities of the processes are set based on the kinetic status of the vehicle, the driving environment, and the conditions of the driver, and the processes that are performed are selected for each unit cycle in accordance with the set priorities, and then the scheduling is performed. The processes are performed in accordance with the process schedule, and as a result, as shown in FIG. 7, the face direction determination, the dozing determination, and the consciousness deterioration level determination are performed in the case of "counter CT=1"; the face direction determination, the line-of-sight direction determination, and the blink detection are performed in the case of "counter CT=2"; and the blink detection and the dozing determination are performed in the case of "counter CT=3". The face direction determination, the line-of-sight direction determination, and the consciousness deterioration level determination are performed in the case of "counter CT=4", the face direction determination and the line-of-sight direction determination are performed in the case of "counter CT=5", and the face direction determination, the dozing determination, and the consciousness deterioration level determination are performed in the case of "counter CT=6".

According to this embodiment, the priorities of the processes are set based on the kinetic status of the vehicle, the driving environment, and the conditions of the driver, and the processes that are performed are selected for each unit cycle in accordance with the set priorities. Thus, it is possible to set an appropriate priority for each process according to the picked-up image, and it is therefore possible to select the performed processes for each unit cycle in accordance with the priorities to accomplish the scheduling. As a result, it is possible to more efficiently perform image processing involving a plurality of processes on the data of the face image of the driver that is picked up by the camera 10 installed in the vehicle.

In addition, a configuration may be adopted in which the calculation load is reduced by setting the priority with which the result of detection is adopted based on the difference in the reliability of blink detection between the right and left eyes, determining the priority regarding which of the right and left eyes should be subjected to the blink detection based on the direction of the face of a driver, and thus skipping the next calculation for the eye for which the above reliability is low or the eye for which the above priority is low, in the above-described second embodiment.

When the positions of right and left eyelids are detected when the driver faces the front, a case can occur in which the accuracy of detection for one of the eyelids is inferior to the accuracy of detection for the other eyelid, depending on the light conditions. A configuration may be adopted in which, in such a case, only the data concerning the blink of the eyelid of the higher reliability is used, and the blink of the other eyelid is assumed to be the same as that of the former eyelid to skip the calculation.

A configuration may be adopted in which the calculation load is reduced by performing detection only for the left eye when the driver faces right, performing detection only for the right eye when the driver faces left, and skipping the line-of-sight direction determination process when the eyes are closed and therefore no blink is detected.

In this way, the priorities of the processes are set with the image data of the face of a driver also taken into account, and it is therefore possible to set an optimum priority for each process, according to the image data of the individual face. As a result, it is made possible to efficiently perform image processing involving a plurality of processes on the image data of the face of the driver.

Although the embodiments of the invention have been described, the invention is not limited to the above-described embodiments, and various modifications can be made. In the description of the above-described embodiments, a case is described by way of example in which the image processing apparatus is installed in a vehicle and sleepiness of a driver is determined based on the data of the picked-up driver's face image. However, needless to say, the scope of the application of the image processing apparatus according to the invention is not limited to these embodiments.

The number of the unit cycles that constitute the fundamental cycle in which the image processing is performed is not limited to six. Further, the contents of the processes and the division of functions of the plurality of processes are not limited to those of the above-described embodiments.

The various sensors, which are components of the driving status detection means 20 and the driving environment sensing means 30 are not limited to those of the above-described embodiments. In place of or in addition to the above-described sensors, one or more different sensors may be used.

In the above-described embodiment, in accordance with the priorities of the processes, the higher the priority of the process is, the greater the number of times the process is performed (processing time) in each unit cycle is. However, a configuration may be adopted in which a process with a higher priority is performed using a highly accurate algorithm, whereas a process with a lower priority is performed using an algorithm with lower accuracy or is skipped.

By preparing a plurality of algorithms with different processing accuracies (operational densities) for each process, and assigning processing resources (processing power) in accordance with the priorities, it is made possible to control the processing load in accordance with the priorities. In addition, using algorithms with low accuracy means that low-load algorithms are used.

Some algorithms show high accuracy but take long time to complete processing; meanwhile, other algorithms show less accuracy but take less time to complete processing. By setting the priorities based on the driving status of the vehicle and the conditions of the driver and selecting algorithms in accordance with the priorities, it is possible to efficiently perform image processing.

The invention claimed is:

1. An image processing apparatus that performs image processing every fundamental cycle by performing a plurality of processes on data of an image picked up by a camera device, the apparatus comprising:
   a process setting section that constitutes the fundamental cycle, in which a series of the image processing are performed, from a plurality of unit cycles, and that selects, from the plurality of processes, the processes that are performed and sets a combination of the selected processes for each of the plurality of unit cycles constituting the fundamental cycle, in accordance with a priority of each of the plurality of processes; and
   a processing section that performs each of the processes in accordance with the combination set by the process setting section, wherein:
   a value of a counter indicative of an order and a combination of the image processing to be performed is set for each of the plurality of unit cycles; and
   the processing section performs each of the processing for each of the plurality of unit cycles sequentially in accordance with the priority and the set value of the counter.

2. The image processing apparatus according to claim 1, wherein the process setting section selects, from the plurality of processes, the processes that are performed and sets the combination of the selected processes for each of the plurality of unit cycles so that the higher the priority of the process is, the higher an occupation rate of the process in the fundamental cycle is.

3. The image processing apparatus according to claim 1, wherein the process setting section sets the combination of the processes in consideration of processing time and required accuracy of each of the processes and/or a required number of times the processes are performed relative to a number of times the picked-up image is received within the fundamental cycle.

4. The image processing apparatus according to claim 1, wherein the process setting section sets the combination of the processes so that the processes that are performed every unit cycle are completed within the unit cycle.

5. The image processing apparatus according to claim 4, wherein the process setting section sets the combination of the processes so that a sum of processing time of the processes that are performed every unit cycle is less than a duration of the unit cycle.

6. The image processing apparatus according to claim 1, wherein the process setting section changes the priorities of the processes, and selects, from the plurality of processes, the processes that are performed for each of the unit cycles in accordance with the changed priorities.

7. The image processing apparatus according to claim 1, further comprising driving status detection section for detecting driving status of a vehicle, wherein:

the camera section is installed in the vehicle; and
the process setting section sets the priority of each of the processes based on the driving status of the vehicle detected by the driving status detection section, and selects, from the plurality of processes, the processes that are performed for each of the unit cycles, in accordance with the set priorities.

8. The image processing apparatus according to claim 1, further comprising driver condition determination section for determining conditions of a driver, wherein:
the image that is picked up by the camera section is a face image of the driver; and
the process setting section sets the priority of each of the processes based on the conditions of the driver determined by the driver condition determination section, and selects, from the plurality of processes, the processes that are performed for each of the unit cycles in accordance with the set priorities.

9. The image processing apparatus according to claim 8, wherein the process setting section also takes into account the face image of the driver picked up by the camera section in setting the priority of each of the processes.

10. The image processing apparatus according to claim 1, wherein the process setting section selects an algorithm to be used to perform each of the processes so that the higher the priority of the process is, the higher the accuracy of the algorithm to be used to perform the process is, and the lower the priority of the process is, the lower the accuracy of the algorithm to be used to perform the process is.

11. The image processing apparatus according to claim 1, wherein the plurality of processes include at least two of a face direction determination process, a line-of-sight direction determination process, a blink detection process, a dozing determination process, and a consciousness deterioration level determination process.

12. An image processing method for performing image processing every fundamental cycle by performing a plurality of processes on data of an image picked up by a camera section,
the method comprising:
constituting the fundamental cycle, in which a series of the image processing are performed, from a plurality of unit cycles:
selecting, from the plurality of processes, the processes that are performed and setting a combination of the selected processes for each of the plurality of unit cycles constituting the fundamental cycle, in accordance with a priority of each of the plurality of processes;
setting a value of a counter indicative of an order and a combination of the image processing to be performed, for each of the plurality of unit cycles; and
performing each of the processes for each of the plurality of unit cycles sequentially in accordance with priority and the set value of the counter.

* * * * *